UNITED STATES PATENT OFFICE.

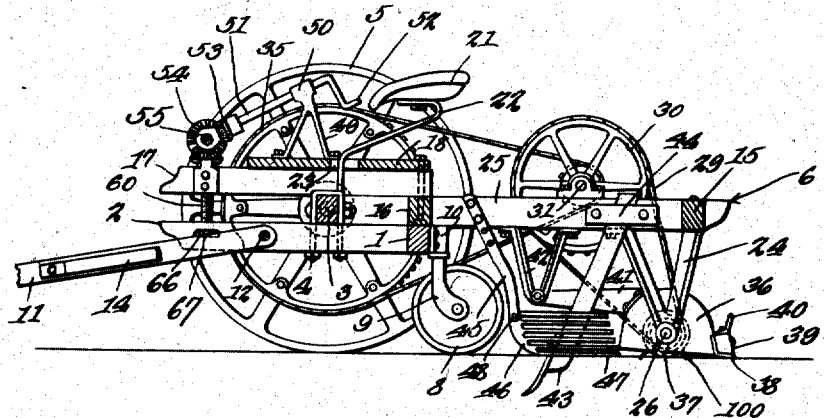

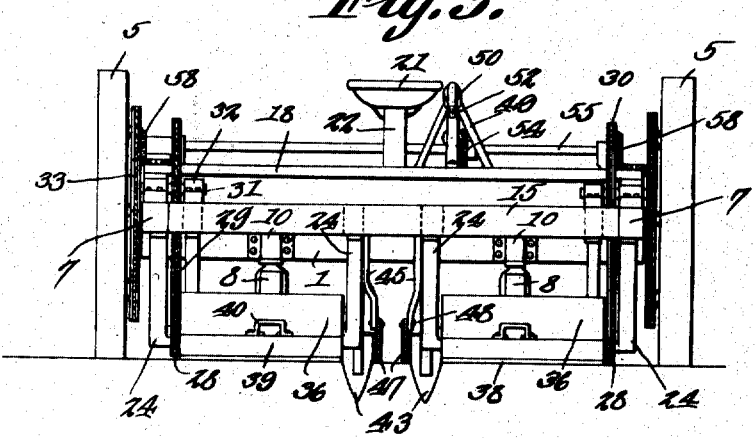
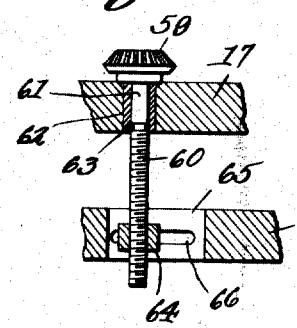
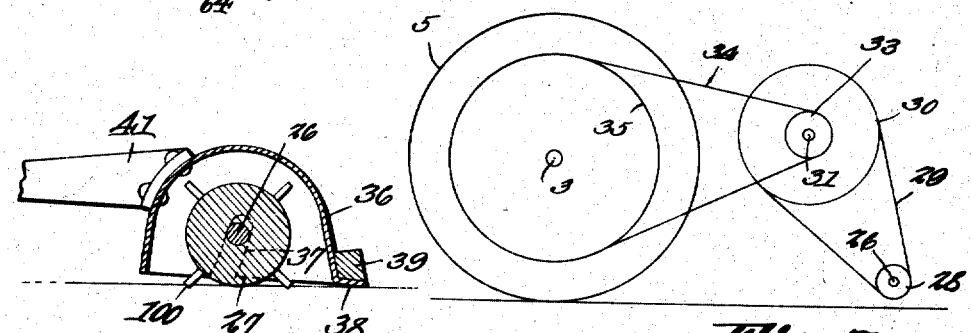

THEOPHILUS R. HARMON, OF OAKLAND, CALIFORNIA.

CULTIVATOR.

1,279,689.  Specification of Letters Patent.  Patented Sept. 24, 1918.

Application filed January 9, 1918. Serial No. 211,041.

*To all whom it may concern:*

Be it known that I, THEOPHILUS R. HARMON, a citizen of the United States, residing at Oakland, in the county of Alameda and State of California, have invented a new and useful Cultivator, of which the following is a specification.

It is the object of this invention to provide a device which will produce a fine dust mulch on top of the soil, and pack down the mulch, in order to preserve the moisture in the soil and to carry a crop safely through a severe drouth, another object of the invention being to provide means whereby the weeds will be eradicated.

Another object of the invention is to provide means whereby, at the will of the operator, the device which produces the mulch and eradicates the weeds may be adjusted vertically.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 shows in vertical longitudinal section, a device constructed in accordance with the present invention, parts appearing in elevation;

Fig. 2 is a top plan;

Fig. 3 is an end elevation;

Fig. 4 is a fragmental transverse section showing a portion of the means whereby relative movement between the frames of the machine is produced;

Fig. 5 is a fragmental longitudinal section, showing a portion of the mechanism delineated in Fig. 4;

Fig. 6 is a fragmental vertical section taken transversely through the mechanism which produces the dust mulch;

Fig. 7 is a diagram showing the driving train whereby the rotary soil-engaging element is driven.

In carrying out the invention there is provided a truck comprising a main frame 1 including side beams 2 to which an axle 3 is secured by U-bolts 4 or otherwise. Ground wheels 5 are journaled on the ends of the axle 3. The main frame 1 is prevented from tilting rearwardly on the axles 3 by means of casters 8 carried by standards 9, the upper ends of which are journaled in bearings 10 mounted on the rear end of the main frame 1. A tongue 11 is pivotally mounted on a cross rod 12 extended between the side beams 2, the tongue being sustained by means of braces 14, the rear ends of which are pivoted on the cross rod.

The invention comprises an auxiliary frame 6 including side beams 7 located exteriorly of the side beams 2 of the main frame 1 and having their forward ends pivotally mounted on the end portions of the axle 3, the construction being such that the auxiliary frame may be swung upwardly and downwardly for adjustment. The auxiliary frame 6 includes a rear cross bar 15 connecting the side beams 7, an intermediate cross bar 16 connecting the side beams 7, longitudinal beams 20, disposed adjacent the sides of the auxiliary frame and extended between the bars 15 and 16, and longitudinal beams 25, disposed adjacent the median plane of the device and extended between the bars 15 and 16. Supplemental beams 17 are superposed on the forward end of the side beams 7 and carry a platform 18 held in place by securing elements 19. The rearmost of these securing elements 19 preferably connect the beams 17 and 7, so that these parts may be regarded as one piece, and be designated, generally, as a "beam". A seat 21 is disposed above the platform 18 and is carried by a support 22 secured to the axle 3 and passing through a hole 23 in the platform 18.

Hangers 24 depend from the beams 7 and 25 and shafts 26 are journaled in the hangers. Rotary diggers 27 are secured to the shafts 26 and carry teeth 100. Pulleys 28 are fixed to the outer ends of the shafts 26 and about the pulleys are trained belts 29. In alluding to pulleys and belts in this specification, it will of course be understood that sprocket wheels and sprocket chains may be used if desired. The belts 29 are trained around pulleys 30 carried by shafts 31 journaled in bearings 32 mounted on the beams 7 and 20. Pulleys 33 are fixed to the outer ends of the shafts 31 and engage belts 34 trained around pulleys 35 mounted to rotate with the ground wheels 5. The pulleys 35 are of large diameter compared with the pulleys 33, and the pulleys 30 are of large diameter compared with the pulleys 28, and it will be obvious that, from the ground wheels 5, a high speed of rotation will be imparted to the shafts 26, and to the rotary diggers 27 carried thereby.

The rotary diggers 27 are inclosed within casings 36 provided at their ends with notches 37 receiving the shafts 26, the construction being such that the casings may move vertically with respect to the shafts. The rear ends of the casings 36 are fashioned into soil-engaging shoes 38 upon which are secured heavy weights 39, provided, if desired, with handles 40, to facilitate the lifting of the casings 36, should occasion demand such a procedure. The rear ends of arms 41 are secured to the casings 36, the forward ends of the arms being pivoted to depending brackets 42 carried by the beams 20 and 25.

Bull tongues 43 are secured as shown at 44 to the beams 25. Downwardly extended supports 45 are attached to the beams 25 in front of the bull tongues 43. Fenders 46 are pivoted at 48 to the supports 45 and include rearwardly extended fingers 47.

The platform 18 carries an upstanding frame 49 terminating in a bearing 50 in which an inclined shaft 51 is journaled, the shaft being provided with a crank 52 whereby the shaft may be rotated by a person occupying the seat 21. The lower forward end of the shaft 51 carries a beveled pinion 53 meshing into a beveled pinion 54 on a transverse shaft 55, the pinions 53 and 54 being held in mesh by means of a yoke 56 engaging the shafts. The transverse shaft 55 is journaled in bearings 57 on the beams 17 of the auxiliary frame. Beveled pinions 58 are secured to the ends of the shaft 55 and mesh into beveled pinions 59 secured to the upper ends of screws 60 having smooth portions 61 journaled in bearings 62 carried by the beams 17. The numeral 68 denotes, in Fig. 5, any suitable means whereby a longitudinal movement of the screws 60 with respect to the beams 17 may be prevented. The screws 60 are threaded into nuts 64 located in recesses 65 fashioned in the beams 2 of the main frame, the beams 2 having, at the sides of the recesses 65, longitudinal slots 66, receiving for sliding movement trunnions 67 constituting parts of the nuts 64.

In practical operation, when the machine, as shown in Fig. 1, is drawn over the ground, the diggers 27 will be rotated rapidly by gear trains comprising the pulleys 28, the belts 29, the pulleys 30, the pulleys 33, the belts 34, the pulleys 35 and the ground wheels 5. The teeth 100 of the diggers 27 will convert the top soil into a dry dust mulch, and the casings 36 will prevent this mulch from being blown about by the wind. Since the casings 36 are carried by the arms 41 which are pivoted to the brackets 42, and in view of the fact that the casings carry the heavy weights 39, the shoes 38, dragging along the ground, will press down and compact the dust mulch produced by the rotary diggers 27. Further, the diggers 27 will serve to tear out and eradicate the weeds. The bull tongues 43 serve to cover up all weeds which cannot be reached by the rotating diggers 27, the fenders 46 preventing the standing plants from being broken down or covered by clods or dirt which may be cast aside by the bull tongues 43. The fenders 46, being pivoted at 48 to their supports 45, follow the contour of the ground, and will be found to be peculiarly efficient for the ends above alluded to.

When it is desired to adjust the rear end of the auxiliary frame 6 vertically, as the machine is being drawn along a highway, or even during the operation of the machine in a field, the shaft 51 is rotated by means of the crank 52, the beveled pinions 53 and 54 impart rotation to the shaft 55, and rotation is imparted to the screws 60 by means of the beveled pinions 58 and 59. The screws 60, working in the nuts 64, tilt the forward end of the auxiliary frame 6 downwardly, and raise the rear end of the auxiliary frame, so that the various soil-engaging elements, such as the rotary diggers 27, may be elevated with respect to the surface of the soil. Since the trunnions 67 of the nuts 64 have movement in the slots 66 of the beams 2 of the main frame, the screws 60 will exercise their functions, without being bent, when the forward ends of the frames 1 and 6 are drawn together by the action of the screws.

Having thus described the invention, what is claimed is:

1. The combination with a truck having a ground wheel, of a rotary soil-engaging member journaled on the truck; means for driving the soil-engaging member from the ground wheel; a packer disposed at the rear of the soil-engaging member and embodying a casing extended about the soil-engaging member; and means for supporting the packer pivotally, for swinging movement, upon the truck.

2. In a device of the class described, a truck; a rotary soil-engaging member journaled on the truck; means for driving the soil-engaging member; a packer disposed at the rear of the soil-engaging member and embodying a casing extended about the soil-engaging member; and means for supporting the packer pivotally, for swinging movement, upon the truck.

3. In a device of the class described, a truck; a ground wheel constituting a part of the truck; hangers depending from the truck; a shaft journaled in the hangers; a rotary soil-engaging member carried by the shaft; means for driving the shaft from the ground wheel; a casing inclosing the soil-engaging member and vertically movable with respect to the shaft, the casing being of sufficient weight to form a packer; an arm carried by the casing; and a hanger mounted on the truck, the arm being pivoted to the last specified hanger.

In testimony that I claim the foregoing as my own, I have hereto affixed my signature in the presence of two witnesses.

THEOPHILUS R. HARMON.

Witnesses:
MARY F. SERGI,
A. L. DEUTHIT.

Copies of this patent may be obtained for five cents each, by addressing the "Commissioner of Patents, Washington, D. C."